United States Patent
Son et al.

(10) Patent No.: US 11,926,310 B2
(45) Date of Patent: Mar. 12, 2024

(54) HYBRID ELECTRIC VEHICLE AND METHOD FOR CONTROLLING SPEED LIMIT FOR THE SAME

(71) Applicants: Hyundai Motor Company, Seoul (KR); Kia Motors Corporation, Seoul (KR)

(72) Inventors: Hui Un Son, Suwon-si (KR); Sang Joon Kim, Seoul (KR); Kyu Hwan Jo, Yongin-si (KR); Sung Bae Jeon, Ansan-Si (KR); Sung Hoon Yu, Hwaseong-si (KR); Joo Young Kim, Hwaseong-si (KR); Jin Kyeom Cho, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 222 days.

(21) Appl. No.: 17/034,297

(22) Filed: Sep. 28, 2020

(65) Prior Publication Data
US 2021/0179064 A1    Jun. 17, 2021

(30) Foreign Application Priority Data
Dec. 16, 2019    (KR) .......................... 10-2019-0167556

(51) Int. Cl.
*B60W 20/13*    (2016.01)
*B60L 58/12*    (2019.01)
(Continued)

(52) U.S. Cl.
CPC ............. *B60W 20/13* (2016.01); *B60L 58/12* (2019.02); *B60W 30/146* (2013.01);
(Continued)

(58) Field of Classification Search
CPC .. B60W 20/13; B60W 30/146; B60W 30/182; B60W 40/105; B60W 2510/1005;
(Continued)

(56) References Cited

U.S. PATENT DOCUMENTS 6,098,733 A * 8/2000 Ibaraki ................ B60W 50/029
                                                  701/55
6,116,363 A * 9/2000 Frank ....................... B60K 6/48
                                                  903/917

(Continued)

FOREIGN PATENT DOCUMENTS

| CN | 107161142 A | * | 9/2017 | |
| KR | 20180031243 A | * | 3/2018 | ............ B60W 10/10 |
| KR | 20180073805 A | * | 7/2018 | ............ B60W 10/10 |

OTHER PUBLICATIONS

Machine Translation of KR-20180031243-A by Espacenet (Year: 2022).*

(Continued)

*Primary Examiner* — Thomas Ingram
*Assistant Examiner* — Faris Asim Shaikh
(74) *Attorney, Agent, or Firm* — Slater Matsil, LLP (57) ABSTRACT

Controlling a speed limit includes determining a virtual vehicle speed as being a lower one of a vehicle speed and a target limit speed, determining a virtual APS value as being a larger one of a first APS value and a second APS value, transitioning to a second mode at a point in time at which an actual APS value and the second APS value become different, when it is expected to transition to the second mode, among a first mode for sustaining a SOC of a battery at the target limit speed and the second mode for depleting the SOC, and determining a transmission gear position by applying the determined virtual vehicle speed and the determined virtual APS value to one of a first shifting pattern and a second shifting pattern.

16 Claims, 11 Drawing Sheets

(51) Int. Cl.
*B60W 30/14* (2006.01)
*B60W 30/182* (2020.01)
*B60W 40/105* (2012.01)

(52) U.S. Cl.
CPC ........ *B60W 30/182* (2013.01); *B60W 40/105* (2013.01); *B60W 2510/1005* (2013.01); *B60W 2510/244* (2013.01); *B60W 2520/10* (2013.01); *B60W 2540/10* (2013.01)

(58) Field of Classification Search
CPC ....... B60W 2510/244; B60W 2520/10; B60W 2540/10; B60W 20/15; B60W 10/10; B60W 2710/083; B60W 2552/15; B60W 30/143; B60W 2555/60; B60W 10/26; B60W 20/10; B60W 2720/10; B60W 10/04; B60W 40/09; B60W 2530/10; B60W 2520/105; B60W 40/10; B60W 2510/0638; B60W 2710/0644; B60W 2552/05; B60W 40/076; B60W 2552/40; B60W 2710/0666; B60W 10/115; B60W 2552/00; B60W 2552/30; B60W 2510/081; B60W 10/02; B60W 10/24; B60W 20/20; B60W 20/30; B60W 20/40; B60W 20/00; B60W 30/188; B60W 30/1882; B60W 2710/085; B60W 2710/0677; B60W 2552/20; B60W 2510/0657; B60W 40/107; B60W 30/18072; B60W 2710/1061; B60W 2710/1005; B60W 2510/083; B60W 2754/30; B60W 2554/4042; B60W 60/00; B60W 2720/106; B60W 40/072; B60W 2710/105; B60W 30/18; B60W 40/068; B60W 60/0023; B60W 2510/10; B60W 2510/08; B60W 2510/082; B60W 2552/25; B60W 2710/0655; B60W 2710/02; B60W 2300/17; B60W 2300/12; B60L 58/12; B60L 15/20; B60L 2240/421; B60L 2240/423; B60L 2240/486; B60L 50/61; B60L 2250/26; B60L 2240/441; B60L 15/2054; B60L 2250/28; B60L 2240/642; B60L 2240/443; B60L 2240/26; B60L 7/14; B60L 2240/16; B60L 50/51; B60L 58/10; B60L 15/2045; B60L 7/12; B60L 2260/28; B60L 50/60; B60L 15/10; B60L 15/2027; B60L 58/40; B60L 2260/24; B60L 2240/54; B60L 2240/645; B60L 2240/647; B60L 53/24; B60L 53/22; B60K 6/48; B60K 2006/4825; B60K 6/387; Y02T 10/62; Y02T 10/70; Y02T 10/72; Y02T 10/7072; Y02T 10/40; Y02T 90/16; Y02T 90/14; B60Y 2200/92; B60Y 2300/146; G05D 2201/0213; G05D 2201/0201; G05D 2201/0204; G05D 2201/0212

See application file for complete search history.

(56) References Cited

U.S. PATENT DOCUMENTS

| | | | | |
|---|---|---|---|---|
| 6,470,256 | B1* | 10/2002 | Cikalo | B60K 31/04 701/93 |
| 6,634,987 | B2* | 10/2003 | Jeon | F16H 61/20 477/114 |
| 2002/0094908 | A1* | 7/2002 | Urasawa | B60K 6/38 903/905 |
| 2004/0153232 | A1* | 8/2004 | Wada | F16H 3/64 701/55 |
| 2008/0228362 | A1* | 9/2008 | Muller | B60W 10/101 701/54 |
| 2009/0036263 | A1* | 2/2009 | Iwase | B60W 10/08 477/3 |
| 2010/0004806 | A1* | 1/2010 | Soma | B60W 10/08 903/915 |
| 2011/0202222 | A1* | 8/2011 | Yamamoto | B60W 20/00 180/65.265 |
| 2012/0083958 | A1* | 4/2012 | Ballard | B60W 50/10 701/56 |
| 2013/0005530 | A1* | 1/2013 | Fujikawa | B60W 10/06 180/65.265 |
| 2014/0005865 | A1* | 1/2014 | Wang | B60W 20/00 477/3 |
| 2015/0066335 | A1* | 3/2015 | Kishi | F02D 41/2416 701/103 |
| 2015/0166048 | A1* | 6/2015 | Herrmann | B60W 20/30 180/65.265 |
| 2016/0244049 | A1* | 8/2016 | Petridis | B60W 20/19 |
| 2017/0043677 | A1* | 2/2017 | Ko | B60W 10/06 |
| 2017/0088048 | A1* | 3/2017 | Iwamoto | B60R 1/00 |
| 2018/0056975 | A1* | 3/2018 | Cho | B60W 20/13 |
| 2018/0094721 | A1* | 4/2018 | Lee | F16H 59/52 |
| 2018/0147931 | A1* | 5/2018 | Toyota | B60K 6/36 |
| 2018/0186230 | A1* | 7/2018 | Fukuda | B60W 10/06 |
| 2020/0385013 | A1* | 12/2020 | Janampally | B60W 50/16 |
| 2021/0053552 | A1* | 2/2021 | Szczepaniak | B60W 10/18 |

OTHER PUBLICATIONS

Machine Translation of CN-107161142-A by Espacenet retrieved on Jun. 15, 2023 (Year: 2023).*

Machine Translation of KR-20180073805-A by Espacenet retrieved on (Year: 2023).*

Translation of CN-107161142-A retrieved from Espacenet on Jun. 15, 2023 (Year: 2023).*

* cited by examiner

HYBRID ELECTRIC VEHICLE AND METHOD FOR CONTROLLING SPEED LIMIT FOR THE SAME

CROSS-REFERENCE TO RELATED APPLICATIONS

This application claims the benefit of Korean Patent Application No. 10-2019-0167556, filed on Dec. 16, 2019, which application is hereby incorporated herein by reference.

TECHNICAL FIELD

The present invention relates to a hybrid electric vehicle and a method for controlling a speed limit for the same.

BACKGROUND

Speed limit apparatuses mean safety driving systems which limit acceleration so that a driver drives a vehicle at a speed which does not exceed a predetermined speed limit so as to prevent speeding. As a representative example of the speed limit apparatuses, a manual speed limit assist (MSLA) function may be used.

In general, during execution of the MSLA function, braking control for deceleration is not performed and thus a vehicle may be accelerated to a predetermined speed or higher on a downhill road, and the relative position/speed of a preceding vehicle are not considered, unlike smart cruise control (SCC), and thus a driver must monitor the road ahead.

Recently, functions such as camera-based SLA (CSLA) using speed limit information recognized through a front camera and intelligent SLA (ISLA) using speed limit information from a navigation system have been developed and applied.

These speed limit apparatuses are defined in SAFETY ASSIST—SPEED ASSIST SYSTEM—SPEED CONTROL FUNCTION, among assessment items of the European new car assessment program (EURO NCAP). This will be described with reference to FIG. 1.

Figure 1:
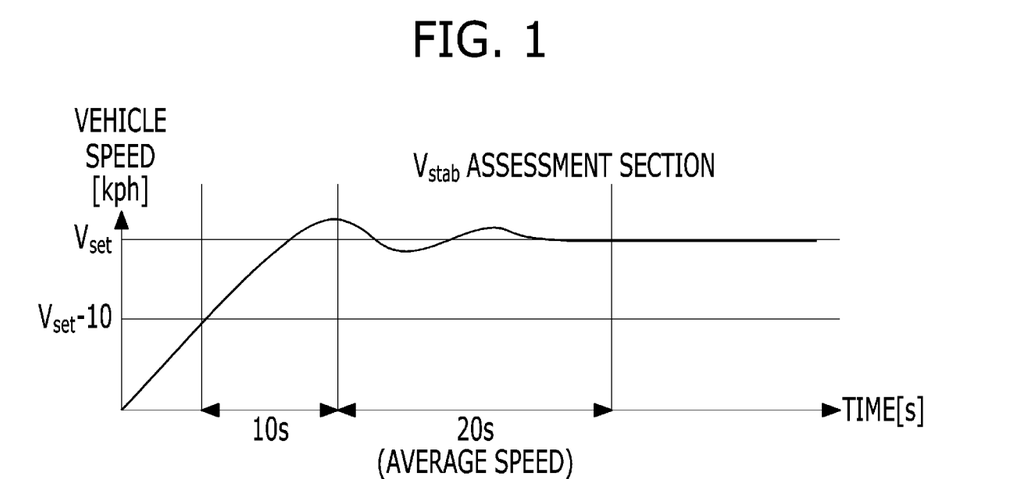
FIG. 1 shows a graph representing assessment criteria of a speed limit apparatus.

FIG. 1 shows a graph representing assessment criteria of a speed limit apparatus.

In FIG. 1, $V_{set}$ indicates the set speed of the speed limit apparatus. Further, $V_{stab}$ indicates the convergence speed of the speed limit apparatus, is defined as an average speed for 20 seconds from 10 seconds after reaching '$V_{set}$-10 kph', and must satisfy the range of '$V_{set-5}<V_{stab}<V_{set}$'.

A hybrid electric vehicle generally uses two types of power sources, and the two types of power sources are mainly an engine and an electric motor. Such a hybrid electric vehicle has excellent fuel efficiency and high power performance and reduces exhaust gas compared to a vehicle having only an internal combustion engine, and is thus actively being developed now.

The hybrid electric vehicle may be operated in two driving modes depending on which powertrain is driven. In an electric vehicle (EV) mode, the hybrid electric vehicle is driven using only the electric motor, and in a hybrid electric vehicle (HEV) mode, the hybrid electric vehicle is driven using both the electric motor and the engine. The hybrid electric vehicle may transition between the two modes depending on conditions during driving.

Figure 2:
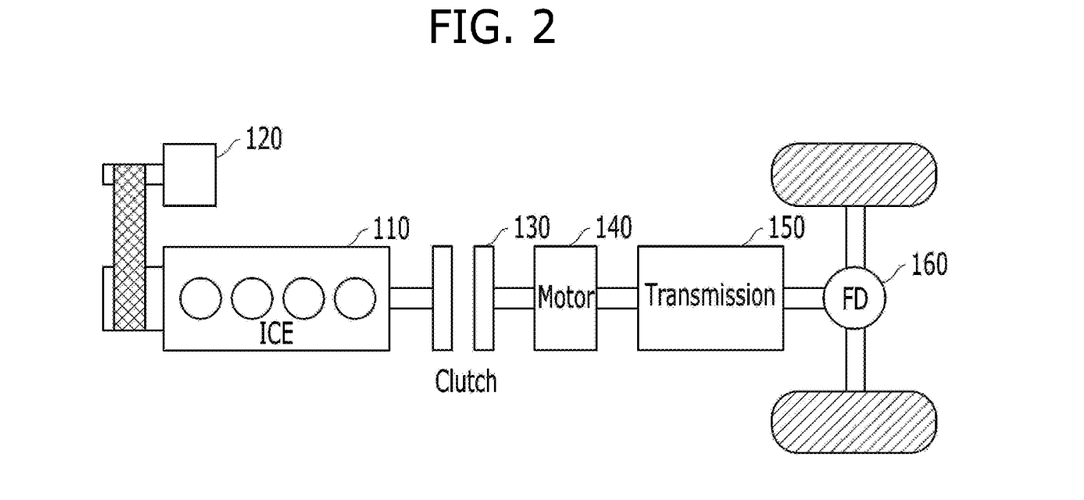
FIG. 2 is a block diagram illustrating one example of a powertrain structure of a parallel-type hybrid electric vehicle.

FIG. 2 is a block diagram illustrating one example of a powertrain structure of a parallel-type hybrid electric vehicle.

FIG. 2 illustrates the powertrain of the parallel-type hybrid electric vehicle employing a parallel-type hybrid system in which a drive motor 140 and an engine clutch (EC) 130 are mounted between an internal combustion engine (ICE) 110 and a transmission 150.

In this vehicle, when a driver depresses an accelerator pedal after starting, the motor 140 is first driven using the power of a battery in the open state of the engine clutch 130, and the power of the battery moves wheels via the transmission 150 and a final drive (FD) 160 (i.e., in the EV mode). When the vehicle is gradually accelerated and thus requires larger driving force, a starter generator motor 120 is operated, and thus the engine 110 may be driven.

Accordingly, when the rotational speeds of the engine 110 and the motor 140 become equal to each other, the engine clutch 130 is engaged, and thereby the vehicle is driven using both the engine 110 and the motor 140 or only by the engine 110 (i.e., transition from the EV mode to the HEV mode). When predetermined engine-off conditions are satisfied, i.e., when the vehicle is decelerated, the engine clutch 130 is opened and the engine 110 is stopped (i.e., transition from the HEV mode to the EV mode). Further, in the hybrid electric vehicle, the driving force of the wheels may be converted into electric energy, and thus the battery may be charged with the electric energy during braking of the vehicle, and such an energy recovery mechanism is referred to as regeneration of braking energy or regenerative braking.

The starter generator motor 120 serves as a start motor when the engine 110 is to be started and is operated as a generator after the engine 110 is started or when starting of the engine 110 is off and the rotating energy of the engine 110 is recovered, and may thus be referred to as a hybrid starter generator (HSG) and, in some cases, referred to as an auxiliary motor.

In addition to the above-described division of the driving mode according to the powertrain, particularly, in case of a plug-in hybrid electric vehicle (PHEV), the driving mode of the plug-in hybrid electric vehicle may be divided into a charge depleting (CD) mode and a charge sustaining (CS) mode based on fluctuation of the state of charge (SOC) of a battery. In general, the plug-in hybrid electric vehicle is driven using an electric motor operated by the power of a battery without the power of an engine in the CD mode, and the vehicle is driven using the power of the engine so as to prevent lowering of the SOC of the battery in the CS mode. Transition between the CD mode and the CS mode may be performed based on the SOC of the battery or based on a driving load according to settings.

In the hybrid electric vehicle, a hybrid control unit is provided as an upper-level control unit for performing overall control of the powertrain (i.e., the engine 110 and the motor 140), and the above-described speed limit function is generally implemented through torque control by the hybrid control unit. This will be described with reference to FIG. 3.

Figure 3:
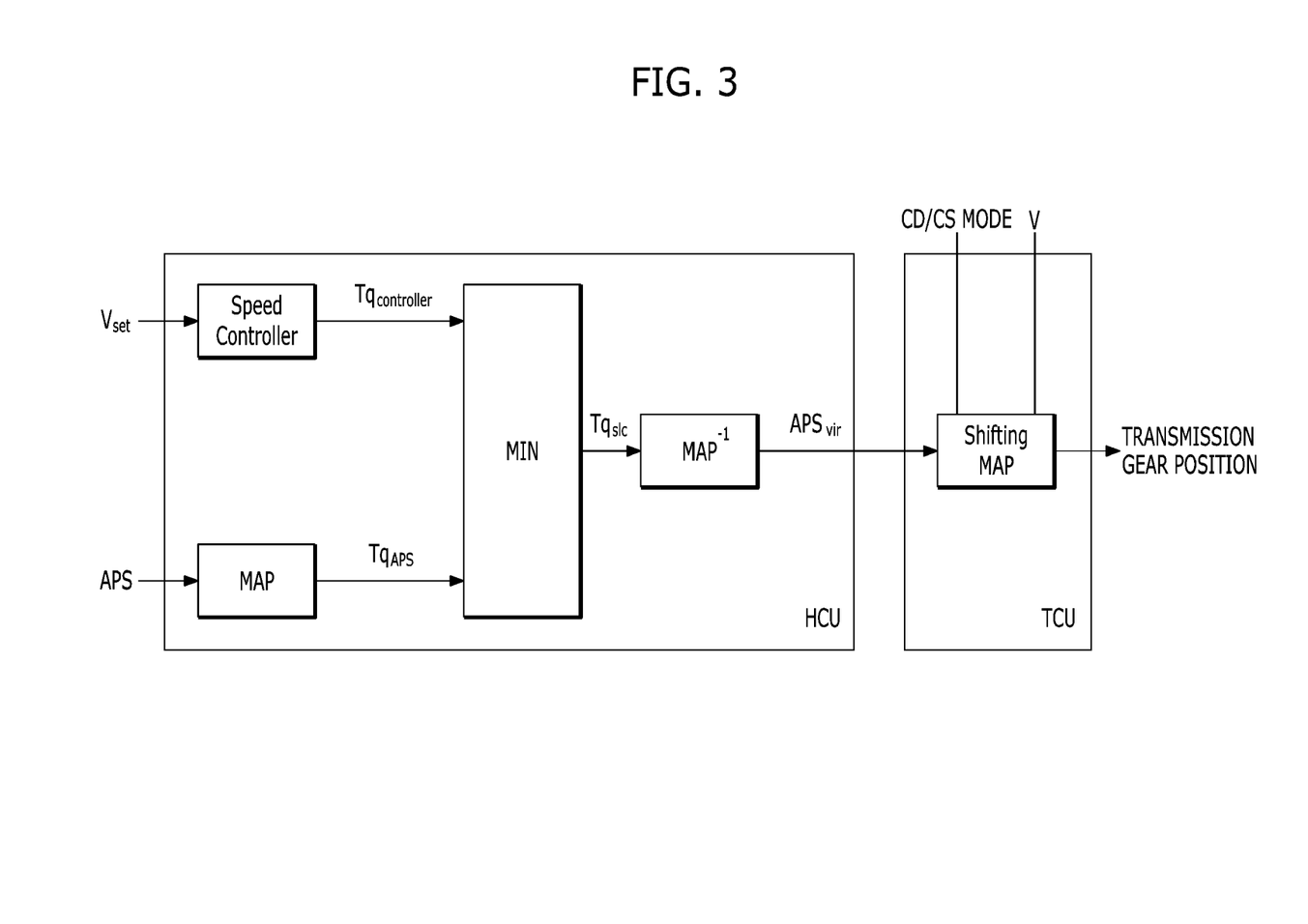
FIG. 3 is a block diagram illustrating one example of the configuration of a control unit for implementing the speed limit function of the hybrid electric vehicle.

FIG. 3 is a block diagram illustrating one example of the configuration of a control unit for implementing the speed limit function of the hybrid electric vehicle.

Referring to FIG. 3, in the hybrid control unit HCU, in order to perform the speed limit function, a speed controller converts a set limit speed $V_{set}$ into a corresponding torque $Tq_{controller}$, and the value of an accelerator pedal sensor (or an accelerator position sensor) APS is converted into driver requested torque $Tq_{APS}$ through a predetermined APS-torque conversion map MAP. The hybrid control unit HCU determines a speed limit torque $Tq_{slc}$ as being the smaller value of the two converted torques $Tq_{controller}$ and $Tq_{APS}$, converts the speed limit torque $Tq_{slc}$ into a virtual APS value $APS_{vir}$, and transmits the virtual APS value $APS_{vir}$ to a transmission control unit TCU for controlling the transmission 150.

In case of the plug-in hybrid electric vehicle (PHEV), the transmission control TCU determines a transmission gear position by applying virtual APS value APS and a current vehicle speed V to a shifting map corresponding to the current set mode, among a shifting map corresponding to the CD mode and a shifting map corresponding to the CS mode. The two shifting maps (shifting patterns) used in the plug-in hybrid electric vehicle (PHEV) will be described with reference to FIG. 4.

Figure 4:
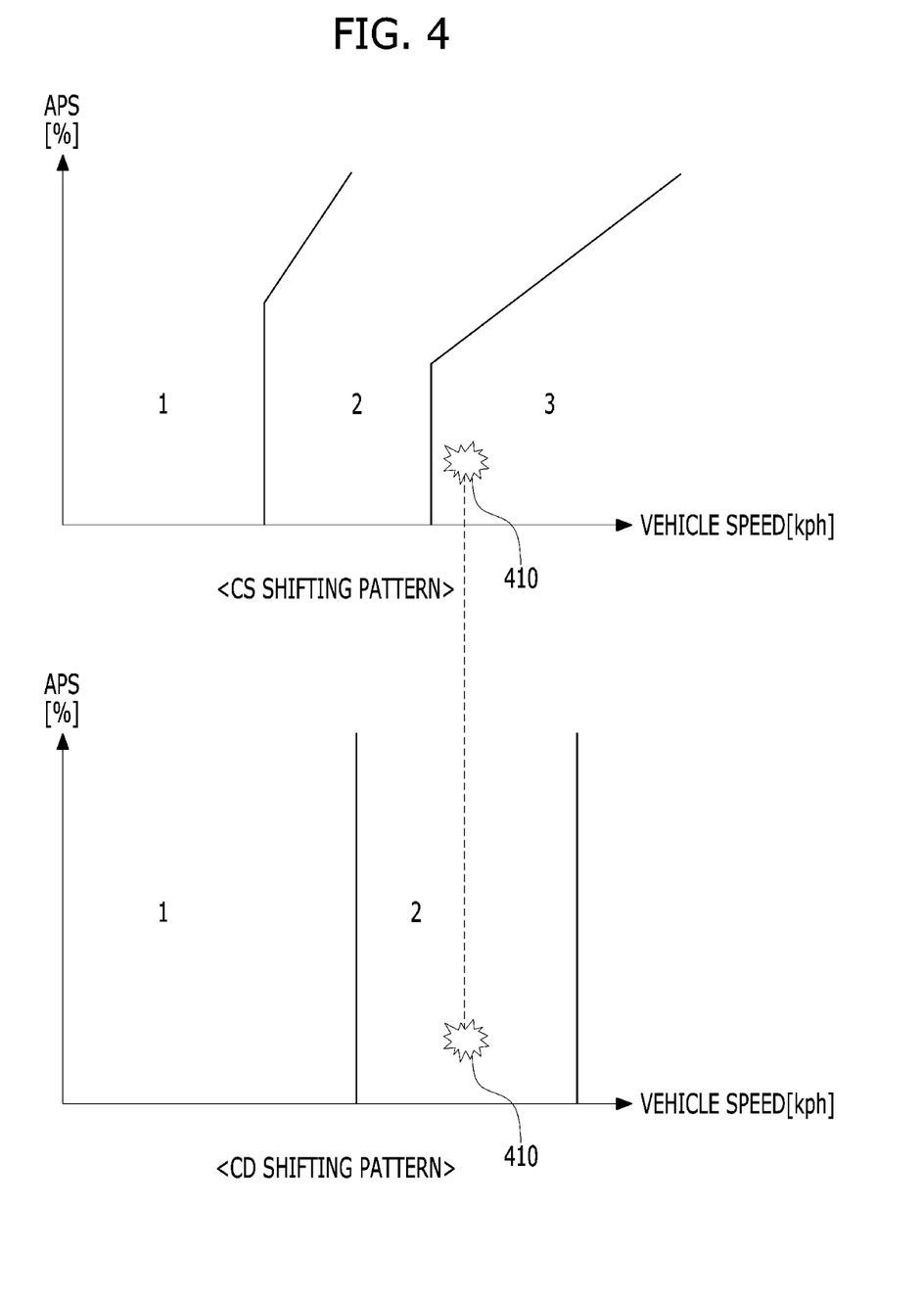
FIG. 4 shows graphs representing a CS shifting pattern and a CD shifting pattern.

FIG. 4 shows graphs representing a CS shifting pattern and a CD shifting pattern.

Referring to FIG. 4, starting of the engine 110 is assumed in the CS mode and thus the CS shifting pattern is configured to maintain a low RPM in consideration of the efficiency of the engine 110, and the motor 140 is mainly used in the CD mode and thus the CD shifting pattern is configured to allow a high RPM in consideration of the efficiency of the motor 140. Therefore, at the same vehicle speed, the same APS value 410 corresponds to the third gear in the CS shifting pattern and corresponds to the second gear in the CD shifting pattern, i.e., a desired gear position may vary depending on the current mode.

The hybrid electric vehicle to which the two shifting maps having different efficiency characteristics are selectively applied is unfavorable for application of the speed limit function to the hybrid electric vehicle. This will be described below with reference to FIGS. 5A and 5B.

Figure 5A:
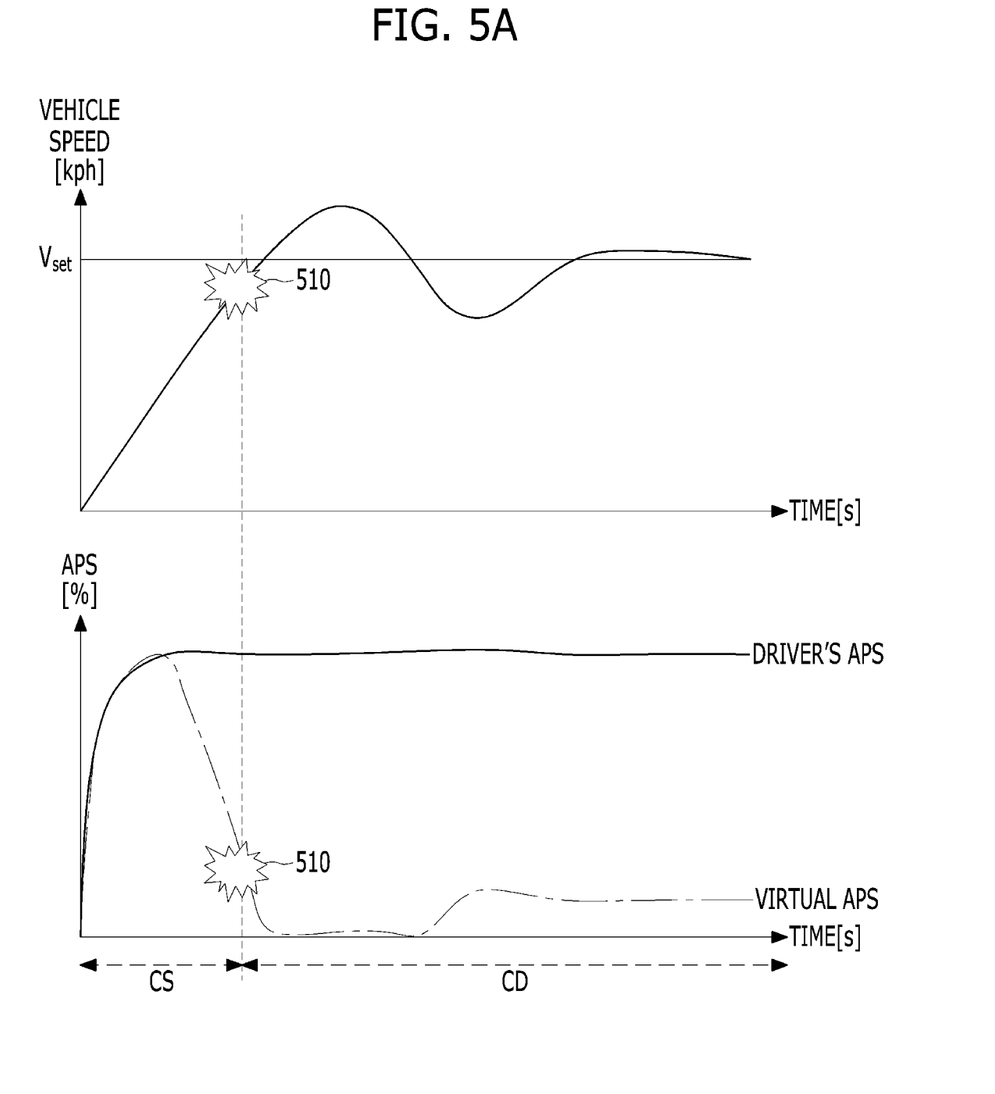
FIG. 5A shows graphs representing one example of change in a vehicle speed, change in an APS value and change in driving modes over time when the speed limit function is applied.
Figure 5B:
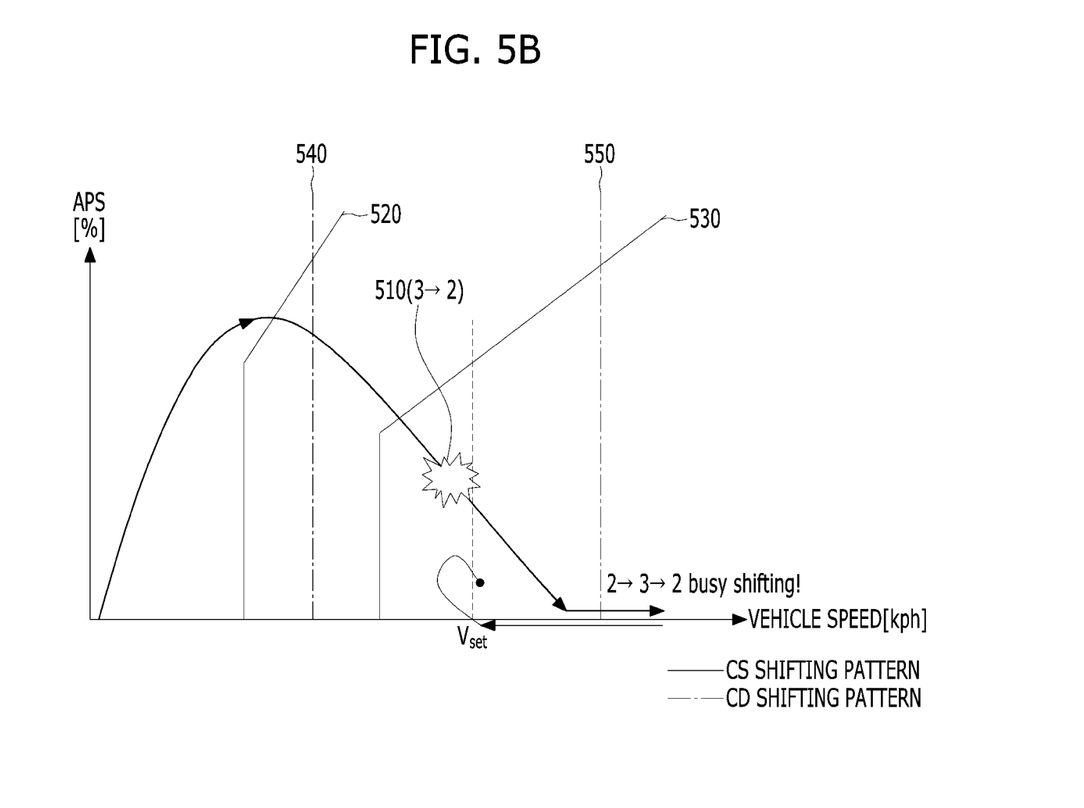
FIG. 5B shows a graph representing one example of the form of shifting under the conditions shown in FIG. 5A.

FIG. 5A shows graphs representing one example of change in a vehicle speed, change in an APS value and change in driving modes over time when the speed limit function is applied, and FIG. 5B shows a graph representing one example of the form of shifting under the conditions shown in FIG. 5A.

Referring to FIG. 5A, if the speed limit function is applied to the hybrid electric vehicle to which the two shifting maps having different efficiency characteristics are selectively applied, the hybrid electric vehicle is accelerated until the vehicle speed reaches the set limit speed $V_{set}$, and thus the CS shifting pattern is applied to the hybrid electric vehicle due to a comparatively high virtual APS value. Thereafter, as the virtual APS value falls to a designated reference or less from a mode transition point 510 at which the vehicle speed is close to the set limit speed $V_{set}$, the hybrid electric vehicle transitions to the CD mode and thus the CD shifting pattern is applied to the hybrid electric vehicle. However, because braking is not involved in the speed limit function, such as the manual speed limit assist (MSLA) function, as described above, although the vehicle speed reaches the set limit speed $V_{set}$ and the virtual APS value becomes the lowest value, the vehicle speed is increased, and when the vehicle speed becomes again lower than the set limit speed $V_{set}$, the virtual APS value is increased and the vehicle speed converges on the set limit speed $V_{set}$.

As shown in FIG. B, in terms of shifting, since the CS shifting pattern is applied before the mode transition point 510, the hybrid electric vehicle is upshifted from the first gear to the second gear when the vehicle speed passes a boundary 520 between the first and second gear positions, and is upshifted from the second gear to the third gear when the vehicle speed passes a boundary 530 between the second and third gear positions. However, when the hybrid electric vehicle transitions to the CD mode at the mode transition point 510, the CD shifting pattern is applied, and vehicle speeds and virtual APS values are present between a boundary 540 between the first and second gear positions and a boundary 550 between the second and third gear positions, and thus, the hybrid electric vehicle is downshifted again from the third gear to the second gear. Thereafter, although the vehicle speed exceeds the set limit speed $V_{set}$ and the virtual APS value is lowered, the vehicle speed is increased and reaches the boundary 550 between the second and third gear positions, the hybrid electric vehicle is upshifted again to the third gear, and when the vehicle speed is decreased again, the hybrid electric vehicle is downshifted to the second gear position, thereby causing unnecessary busy shifting. Moreover, due to such busy shifting, requested torque cannot be satisfied and thus overshoot in which the virtual APS value is excessively increased occurs, and since braking is not involved, it takes a considerably long time for the vehicle speed to reach the target speed after the occurrence of overshoot, and thus, it is difficult to satisfy the requirements of the EURO NCAP or the like.

SUMMARY

Accordingly, the present invention relates to a hybrid electric vehicle and a method for controlling a speed limit for the same that substantially obviate one or more problems due to limitations and disadvantages of the related art. Particular embodiments relate to a hybrid electric vehicle which may prevent unnecessary shifting in the state in which a speed limit function is set and a method for controlling a driving mode therefor.

An embodiment of the present invention provides a hybrid electric vehicle which may provide a more effective vehicle speed limit function, and a method for controlling a driving mode thereof.

Another embodiment of the present invention provides a method which may prevent frequent shifting and overshoot during a process of following a target limit speed when a vehicle speed limit function is applied to a hybrid electric vehicle to which two shifting patterns having different efficiency characteristics are selectively applied.

Additional advantages, objects, and features of embodiments of the invention will be set forth in part in the description which follows and in part will become apparent to those having ordinary skill in the art upon examination of the following, or may be learned from practice of the invention. The objectives and other advantages of embodiments of the invention may be realized and attained by the structure particularly pointed out in the written description and claims hereof as well as the appended drawings.

To achieve these objects and other advantages and in accordance with the purpose of the invention, as embodied and broadly described herein, a method for controlling a speed limit of a hybrid electric vehicle includes determining a virtual vehicle speed as being a lower one of a vehicle speed and a target limit speed, determining a virtual APS value as being a larger one of a first accelerator position sensor (APS) value corresponding to a constant-speed driving load at the target limit speed and a second APS value configured to follow the target limit speed, transitioning to a second mode at a point in time at which an actual APS value and the second APS value become different, when it is expected to transition to the second mode, among a first mode configured to sustain a state of charge (SOC) of a battery at the target limit speed and the second mode configured to deplete the SOC, and determining a transmission gear position by applying the determined virtual vehicle speed and the determined virtual APS value to one of a first shifting pattern corresponding to the first mode and a second shifting pattern corresponding to the second mode, depending on whether or not to transition to the second mode.

In another embodiment of the present invention, a method for controlling a speed limit of a hybrid electric vehicle includes correcting a virtual vehicle speed to a target limit speed when a vehicle speed is higher than the target limit speed, correcting a virtual APS value to a first accelerator position sensor (APS) value when the first APS value corresponding to a constant-speed driving load at the target limit speed is smaller than a second APS value configured to follow the target limit speed, transitioning to a second mode at a point in time at which an actual APS value and the second APS value become different, when it is expected to transition to the second mode, among a first mode configured to sustain a state of charge (SOC) of a battery at the target limit speed and the second mode configured to deplete the SOC, and determining a transmission gear position by applying the virtual vehicle speed and the virtual APS value to one of a first shifting pattern corresponding to the first mode and a second shifting pattern corresponding to the second mode, depending on whether or not to transition to the second mode.

In yet another embodiment of the present invention, a hybrid electric vehicle includes a hybrid control unit including a vehicle speed corrector configured to determine a virtual vehicle speed as being a lower one of a vehicle speed and a target limit speed, a virtual APS corrector configured to determine a virtual APS value as being a larger one of a first accelerator position sensor (APS) value corresponding to a constant-speed driving load at the target limit speed and a second APS value configured to follow the target limit speed, and a mode corrector configured to determine to transition to a second mode at a point in time at which an actual APS value and the second APS value become different, when it is expected to transition to the second mode, among a first mode configured to sustain a state of charge (SOC) of a battery at the target limit speed and the second mode configured to deplete the SOC, and a transmission control unit configured to determine a transmission gear position by applying the determined virtual vehicle speed and the determined virtual APS value to one of a first shifting pattern corresponding to the first mode and a second shifting pattern corresponding to the second mode, depending on whether or not to transition to the second mode.

In a further embodiment of the present invention, a hybrid electric vehicle includes a hybrid control unit including a vehicle speed corrector configured to correct a virtual vehicle speed to a target limit speed when a vehicle speed is higher than the target limit speed, a virtual APS corrector configured to correct a virtual APS value to a first accelerator position sensor (APS) value when the first APS value corresponding to a constant-speed driving load at the target limit speed is smaller than a second APS value configured to follow the target limit speed, and a mode corrector configured to determine to transition to a second mode at a point in time at which an actual APS value and the second APS value become different, when it is expected to transition to the second mode, among a first mode configured to sustain a state of charge (SOC) of a battery at the target limit speed and the second mode configured to deplete the SOC, and a transmission control unit configured to determine a transmission gear position by applying the virtual vehicle speed and the virtual APS value to one of a first shifting pattern corresponding to the first mode and a second shifting pattern corresponding to the second mode, depending on whether or not to transition to the second mode.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain principles of the invention. In the drawings.

DETAILED DESCRIPTION OF ILLUSTRATIVE EMBODIMENTS

Reference will now be made in detail to preferred embodiments of the present invention, examples of which are illustrated in the accompanying drawings. However, the disclosure of the invention is not limited to the embodiments set forth herein and may be variously modified. In the drawings, in order to clearly describe the present invention, descriptions of elements which are not related to embodiments of the present invention are omitted, and the same or similar elements are denoted by the same reference numerals even when they are depicted in different drawings.

In the following description of the embodiments, it will be understood that, when a part "includes" an element, the part may further include other elements, and does not exclude the presence of such other elements, unless stated otherwise. Further, in the following description of the embodiments, parts denoted by the same reference numerals indicate the same elements.

Prior to the description of a hybrid electric vehicle and a method for controlling a speed limit therefor according to embodiments of the present invention, a control system of a hybrid electric vehicle to which the embodiments of the present invention are applicable will be described.

Figure 6:
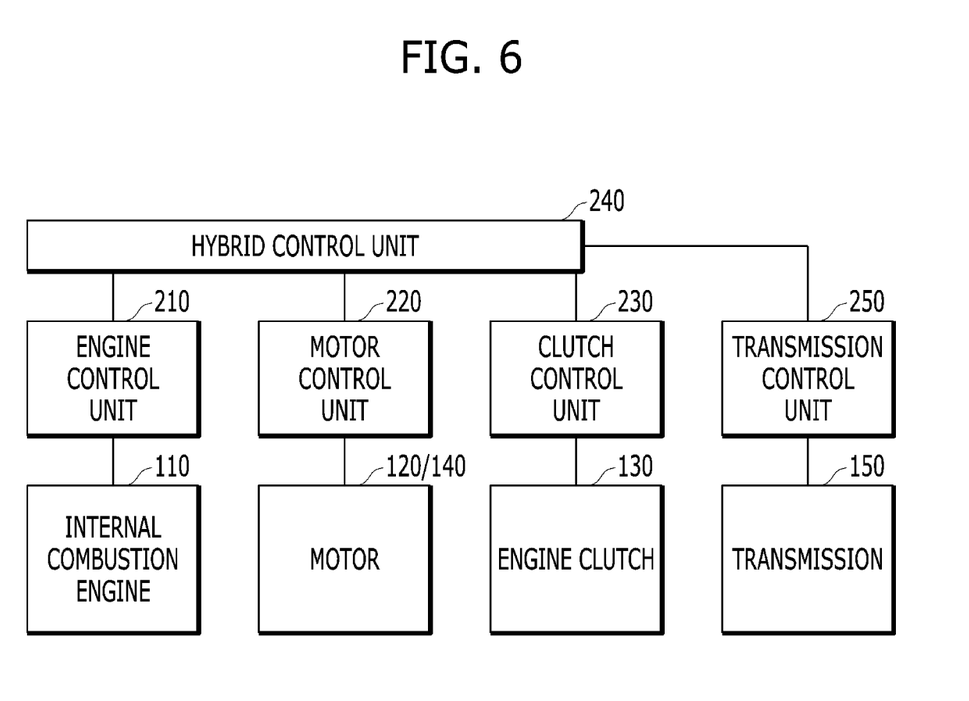
FIG. 6 is a block diagram illustrating one example of a control system of a hybrid electric vehicle to which embodiments of the present invention are applicable.

FIG. 6 is a block diagram illustrating one example of the control system of the hybrid electric vehicle to which the embodiments of the present invention are applicable.

Referring to FIG. 6, in the hybrid electric vehicle to which the embodiments of the present invention are applicable, an internal combustion engine 110 may be controlled by an engine control unit 210, a starter generator motor 120 and a drive motor 140 (motor 120/140) may be controlled by a motor control unit (MCU) 220, and an engine clutch 130 may be controlled by a clutch control unit 230. Here, the engine control unit 210 may be referred to as an engine management system (EMS). Further, a transmission 150 is controlled by a transmission control unit 250.

The respective control units are connected to a hybrid control unit (HCU) 240 which is provided as an upper-level control unit for controlling the entirety of a mode transition process, and may provide information necessary for changing in the driving mode, controlling the engine clutch 230 during shifting and/or controlling stoppage of the engine 110 to the hybrid control unit 240 or performing an operation corresponding to a control signal from the hybrid control unit 240 under the control of the hybrid control unit 240.

In more detail, the hybrid control unit 240 determines whether or not transition between the EV mode and the HEV mode or transition between the CD mode and the CS mode is to be performed depending on the driving state of the vehicle. For example, the hybrid control unit 240 determines a point in time at which the engine clutch 130 is opened, and controls a hydraulic pressure (if the engine clutch 130 is a wet engine clutch) or controls a torque capacity (if the engine clutch 130 is a dry engine clutch) when the engine clutch 130 is opened. Further, the hybrid control unit 240 may determine the state (lock-up, slip or open) of the engine clutch 130, and control a point in time at which fuel injection of the engine 110 is stopped. Further, the hybrid control unit 240 may transmit a torque command to control the torque of the starter generator motor 120 to the motor control unit 220 so as to control stoppage of the engine 110, and thus control recovery of rotational energy of the engine 110. Moreover, the hybrid control unit 240 may control lower-level control units so as to determine mode transition conditions and to transition between the modes while controlling driving mode transition.

Of course, the above-described connection relationships between the control units and the functions of and divisions between the respective control units are merely exemplary, and it will be apparent to those skilled in the art that the control units are not limited to the names above. For example, the hybrid control unit 240 may be implemented such that a corresponding function thereof may be performed by any one of the control units other than the hybrid control unit 240, or be implemented such that corresponding functions thereof may be distributed to two or more of the control units other than the hybrid control unit 240.

The above-described configuration shown in FIG. 6 is merely one example of the configuration of the hybrid electric vehicle, and the hybrid electric vehicle to which the embodiments of the present invention are applicable is not limited to this configuration.

Hereinafter, based on the above-described configuration of the hybrid electric vehicle, speed limit control according to the embodiments of the present invention will be described.

One embodiment of the present invention suggests prevention of shifting due to change in a vehicle speed at a set limit speed or more through vehicle speed correction, prevention of shifting due to overshoot by correcting the minimum value of a virtual APS value to an APS value during constant-speed driving at the set limit speed, and prevention of shifting due to shifting pattern change by performing mode transition in advance, when it is expected to transition between modes. For this purpose, the configuration of a control system will be described with reference to FIG. 7.

Figure 7:
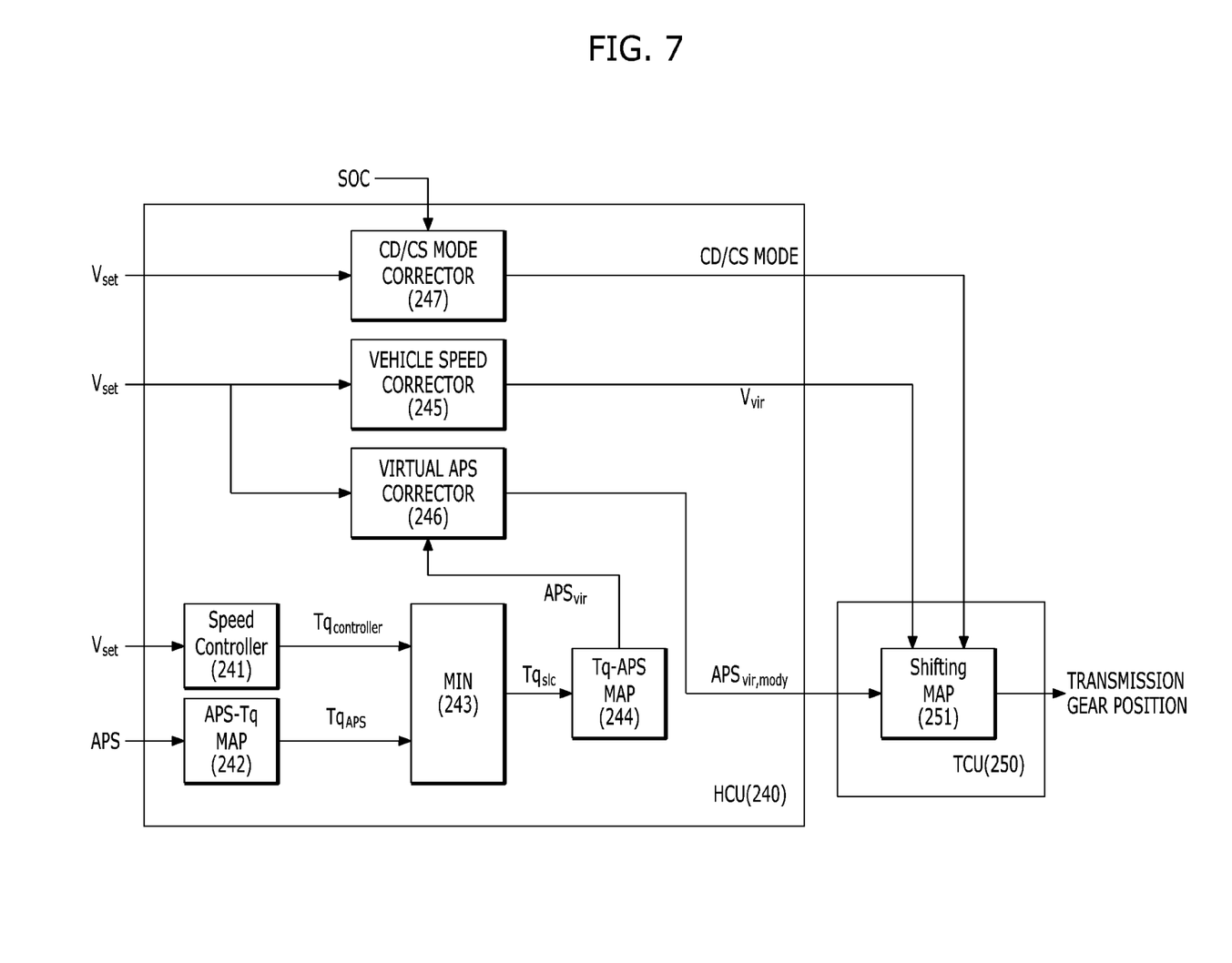
FIG. 7 is a block diagram illustrating one example of the configuration of a control system configured to perform speed limit control according to one embodiment of the present invention.

FIG. 7 is a block diagram illustrating one example of the configuration of a control system configured to perform speed limit control according to one embodiment of the present invention.

Referring to FIG. 7, the hybrid control unit 240 according to one embodiment of the present invention may include a speed controller 241, an APS-torque conversion map 242, a comparator 243, a torque-APS conversion map 244, a vehicle speed corrector 245, a virtual APS corrector 246, and a CD/CS mode corrector 247.

Here, the speed controller 241, the APS-torque conversion map 242, the comparator 243 and the torque-APS conversion map 244 are similar to those in the configuration of FIG. 3, and a detailed description thereof will thus be omitted. A shifting map 251 of the transmission control unit 250 is provided with a CD shifting pattern and a CS shifting pattern, similar to the configuration of FIG. 3. However, the torque-APS conversion map 244 transmits a virtual APS value $APS_{vir}$ to the virtual APS corrector 246 instead of transmitting the virtual APS value $APS_{vir}$ to the transmission control unit 250, unlike the configuration of FIG. 3.

Hereinafter, the remaining elements 245, 246 and 247 of the hybrid control unit 240 will be described.

First, the vehicle speed corrector 245 will be described with reference to FIG. 8.

Figure 8:
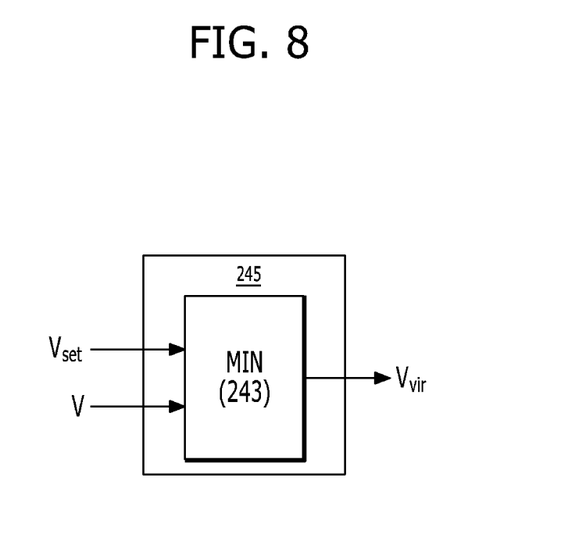
FIG. 8 is a view illustrating the operation of a vehicle speed corrector according to one embodiment of the present invention.

FIG. 8 is a view illustrating the operation of the vehicle speed corrector according to one embodiment of the present invention.

Referring to FIG. 8, the vehicle speed corrector 245 outputs the lower one of a set limit speed $V_{set}$ and a vehicle speed V as a virtual speed $V_{vir}$, and the virtual speed $V_{vir}$ is transmitted to the transmission control unit 250 instead of the existing vehicle speed V. Thereby, although the actual vehicle speed V exceeds the set limit speed $V_{set}$, the virtual speed $V_{vir}$ remains under the set limit speed $V_{set}$, and thus, shifting due to an increase in the vehicle speed V may be prevented.

Next, the virtual APS corrector 246 will be described with reference to FIG. 9.

Figure 9:
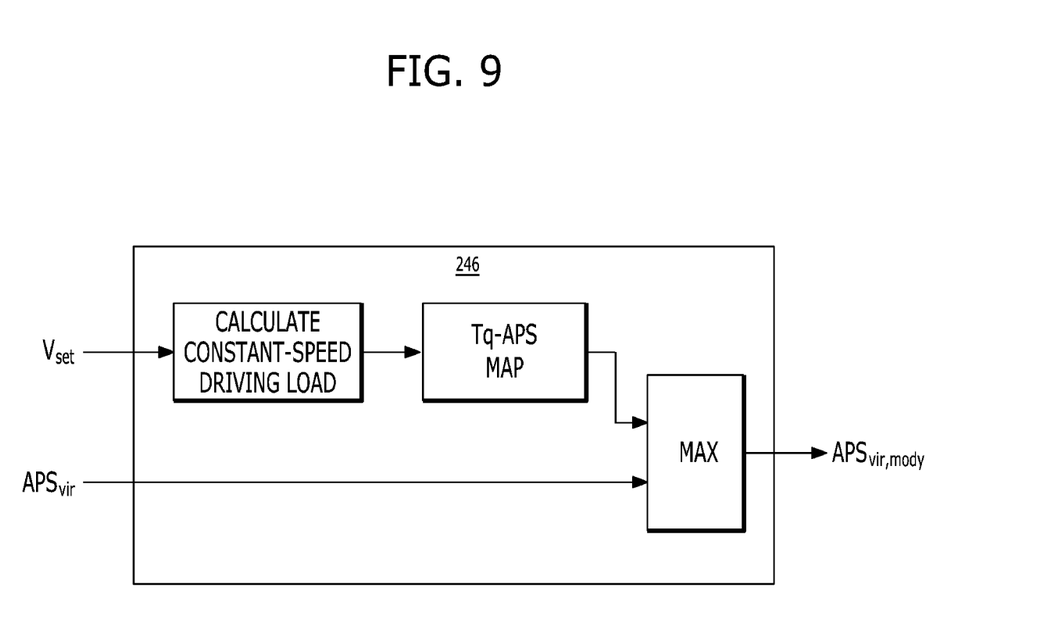
FIG. 9 is a view illustrating the operation of a virtual APS corrector according to one embodiment of the present invention.

FIG. 9 is a view illustrating the operation of the virtual APS corrector according to one embodiment of the present invention.

Referring to FIG. 9, the virtual APS corrector 246 calculates a constant-speed driving load at the set limit speed $V_{set}$ and acquires an APS value corresponding to a corresponding torque through the torque-APS conversion map 244. Here, the constant-speed driving load may be calculated through a map predetermined through tests, or using the rolling resistance of the vehicle and an air resistance coefficient, and be corrected based on slope or road surface information. The virtual APS corrector 246 outputs the larger one of the APS value for constant-speed driving at the set limit speed $V_{set}$ and the virtual APS value APS determined through the torque-APS conversion map 244 as a corrected virtual APS value $APS_{vir}$ and transmits the corrected virtual APS value $APS_{vir,mody}$ to the transmission control unit 250 instead of the existing virtual APS value $APS_{vir}$. That is to say, it may be regarded that the APS value transmitted to the transmission control unit 250 is corrected when the APS value $APS_{SS}$ corresponding to the constant-speed driving load is greater than the virtual APS value $APS_{vir}$.

Thereby, the minimum value of the APS value $APS_{vir,mody}$ transmitted to the transmission control unit 250 becomes the APS value for constant-speed driving at the set limit speed $V_{set}$, and thus, as the virtual APS value $APS_{vir}$ becomes 0 after passing a target limit speed due to overshoot, shifting occurring during a process of restoring the normal state thereof may be prevented.

Next, the CD/CS mode corrector 247 will be described with reference to FIG. 10.

Figure 10:
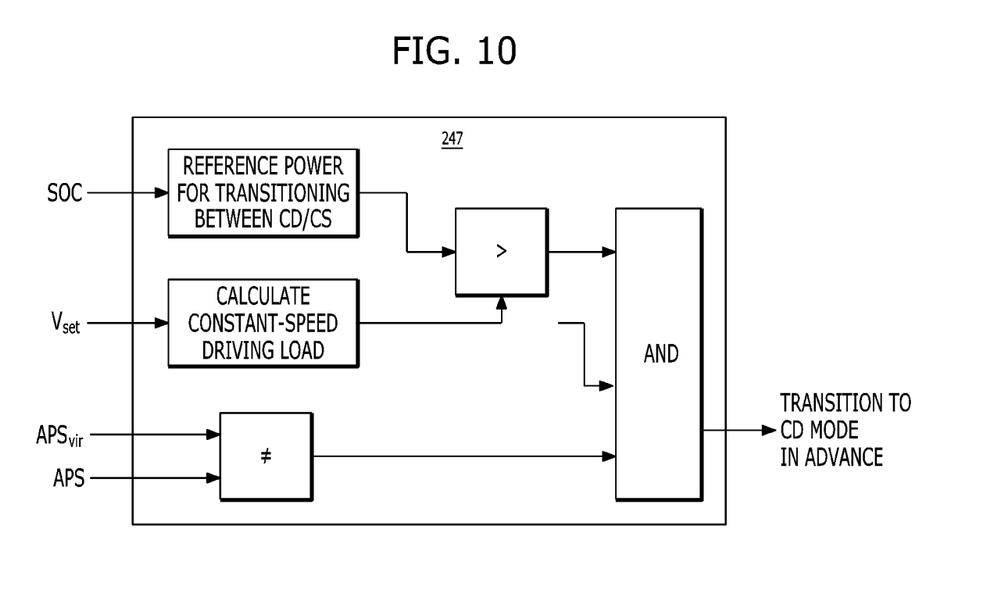
FIG. 10 is a view illustrating the operation of a CD/CS mode corrector according to one embodiment of the present invention.

FIG. 10 is a view illustrating the operation of the CD/CS mode corrector according to one embodiment of the present invention.

With reference to FIG. 10, the CD/CS mode corrector 247 may determine whether or not the vehicle is to transition to the CD mode by comparing the driving load for constant-speed driving at the set limit speed $V_{set}$ with a reference power serving as a criterion for transitioning between the CD mode and the CS mode depending on the current SOC. The reason for this is that the vehicle is in the CS mode during acceleration, but when the constant-speed driving load is not greater than the reference power at the set limit speed $V_{set}$ (i.e., reference power>constant-speed driving load), the vehicle will transition to the CD mode. Therefore, the CD/CS mode corrector 247 may determine to transition in advance to the CD mode from a point in time at which the actual APS value and the virtual APS value APS become different (i.e., $Tq_{APS} > Tq_{controller}$). Thereby, upshifting to the gear position in the CD mode may be performed until the vehicle reaches the set limit speed $V_{set}$, and thus, busy shifting may be prevented.

The effects of the above-described speed limit control will be described with reference to FIGS. 11A and 11B.

Figure 11A:
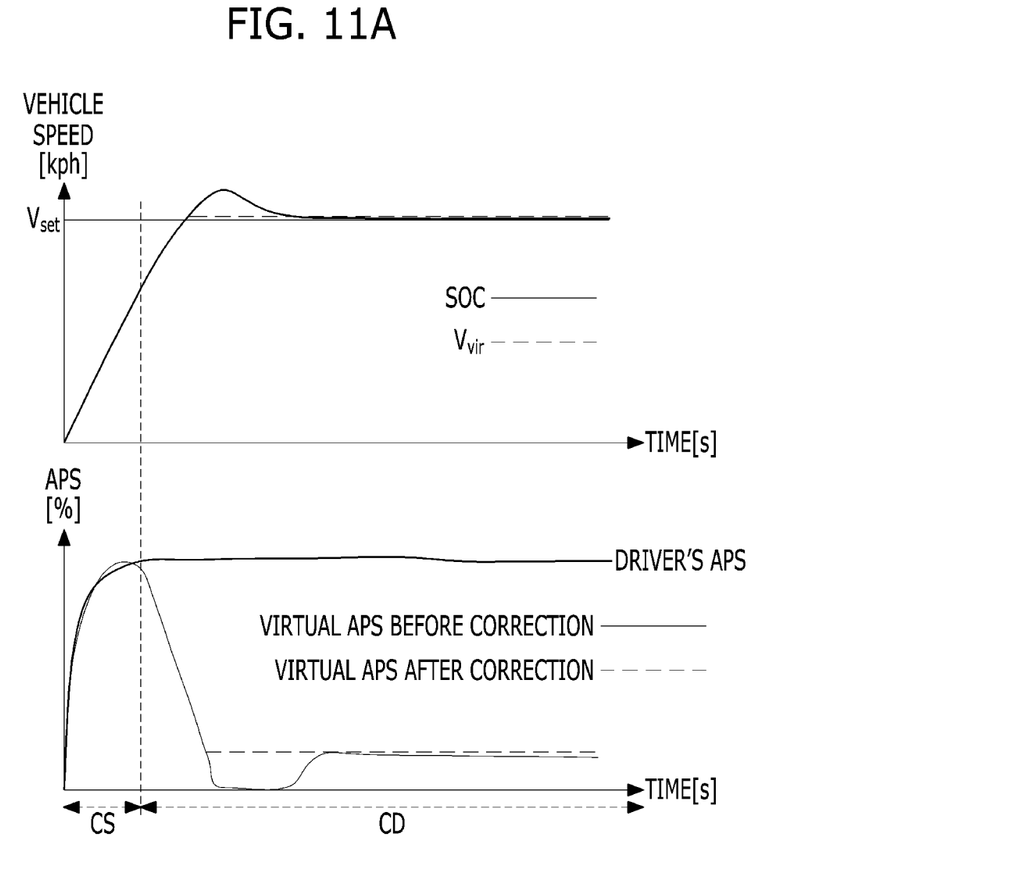
FIG. 11A shows graphs representing one example of change in a vehicle speed, change in a virtual APS value and change in driving modes over time when the speed limit function according to one embodiment of the present invention is applied.
Figure 11B:
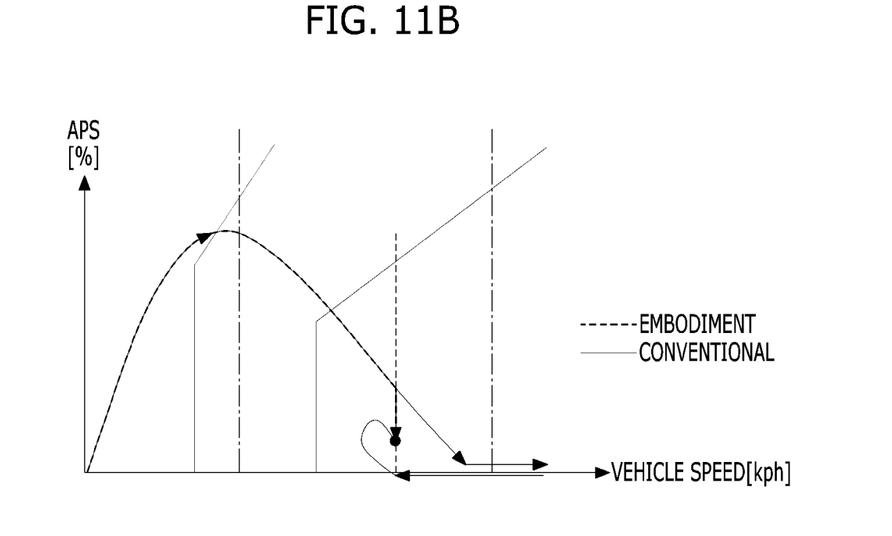
FIG. 11B shows a graph representing one example of the form of shifting under the conditions shown in FIG. 11A.

FIG. 11A shows graphs representing one example of change in a vehicle speed, change in a virtual APS value and change in driving modes over time when the speed limit function according to one embodiment of the present invention is applied, and FIG. 11B shows a graph representing one example of the form of shifting under the conditions shown in FIG. 11A.

Referring to FIG. 11A, if the speed limit function is applied to the hybrid electric vehicle to which the two shifting maps having different efficiency characteristics are selectively applied, the hybrid electric vehicle is accelerated until the vehicle speed reaches the set limit speed $V_{set}$ and thus the CS shifting pattern is applied to the hybrid electric vehicle due to a comparatively high virtual APS value. However, in this embodiment, when the driving load at the target limit speed is lower than the reference power serving as the criterion for transitioning between the CS mode and the CD mode, the hybrid electric vehicle transitions to the CD mode in advance from a point in time at which the virtual APS value and the driver's APS value become different, the minimum value of the virtual APS value is corrected to an APS value corresponding to the constant-speed driving load at the target limit speed and thus the virtual APS value does not become 0 even through the vehicle speed exceeds the set limit speed $V_{set}$, and thereby, busy shifting due to change in the virtual APS value may be prevented.

Further, as shown in FIG. 11B, the vehicle speed input to the transmission control unit 250 does not exceed the set limit speed $V_{set}$ and thus shifting due to exceeding the set limit speed $V_{set}$ does not occur, and mode transition is performed in advance and thus shifting due to mode transition near the set limit speed $V_{set}$ does not occur.

A process for controlling the speed limit according to the above-described embodiments of the present invention will be described with reference to FIG. 12, as follows.

Figure 12:
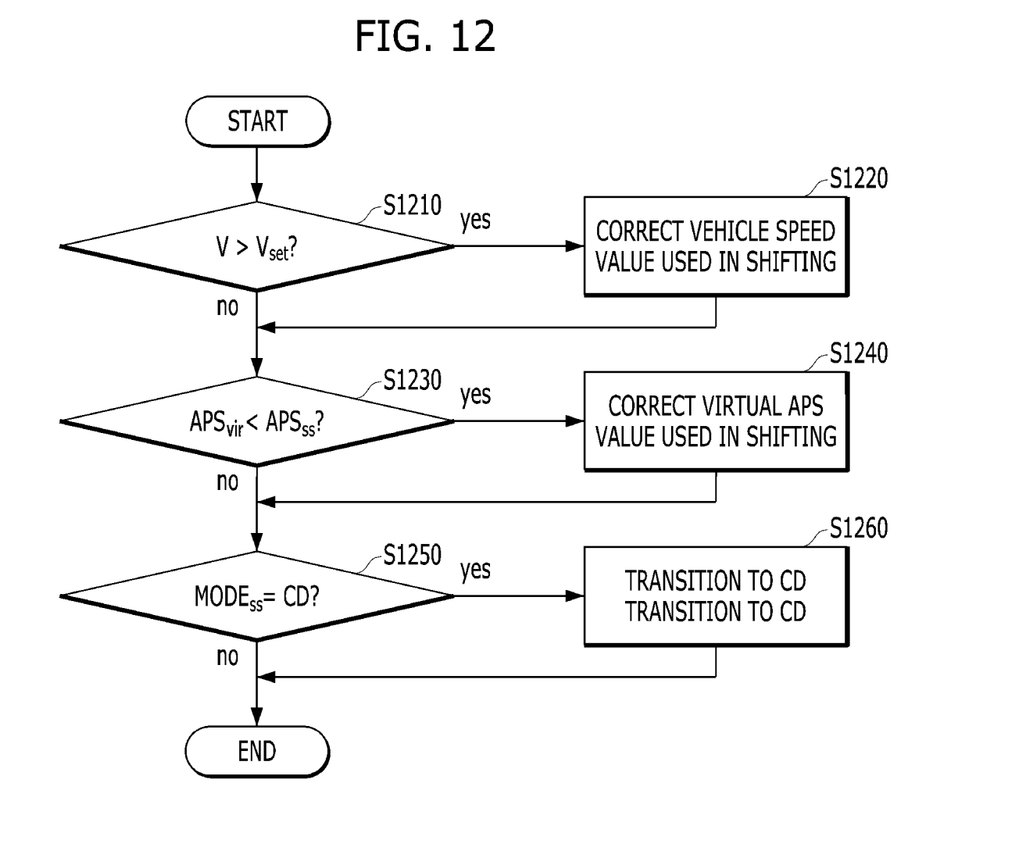
FIG. 12 is a flowchart illustrating one example of a process for controlling a speed limit according to one embodiment of the present invention.

FIG. 12 is a flowchart illustrating one example of a process for controlling a speed limit according to one embodiment of the present invention. In FIG. 12, a situation, in which a virtual APS value $APS_{vir}$ is already being acquired by operating the speed controller 241, the APS-torque conversion map 242, the comparator 243 and the torque-APS conversion map 244, is assumed.

Referring to FIG. 12, when the vehicle speed V is higher than the set limit speed $V_{set}$ (Yes in S1210), the vehicle speed corrector 245 of the hybrid control unit 240 corrects a virtual vehicle speed $V_{vir}$ to be input to the transmission control unit 250 to the lower one of the vehicle speed V and the set limit speed $V_{set}$ (S1220).

Further, when the APS value $APS_{SS}$ corresponding to the constant-speed driving load at the set limit speed $V_{set}$ is greater than the virtual APS value $APS_{vir}$ (Yes in S1230), the virtual APS corrector 246 of the hybrid control unit 240 may correct a virtual APS value to be input to the transmission control unit 250 to the APS value $APS_{SS}$ corresponding to the constant-speed driving load (i.e., the APS value$_{vir,mody}$) (S1240).

Further, when it is expected that the driving mode $MODE_{SS}$ at the set limit speed is the CD mode (Yes in S1250), the CD/CS mode corrector 247 of the hybrid control unit 240 may determine that the hybrid electric vehicle transitions to the CD mode in advance at a point in time at which the actual APS value and the virtual APS value $APS_{vir}$ become different (S1260).

The effects of the speed limit control according to the above-described embodiments are as follows.

A vehicle speed limit apparatus does not generate braking torque for deceleration, and thus, when overshoot occurs during operation of the vehicle speed limit apparatus, a vehicle speed exceeds a target limit speed for a considerably long time. If the state in which the vehicle speed exceeds the target limit speed persists for a long time, marketability of the vehicle speed limit apparatus may be seriously deteriorated and negative results of the NCAP may be caused. Further, as speed limit apparatuses using a camera and a navigation system, such as intelligent speed limit assist (ISLA), are under continual development, the speed limit control according to these embodiments may prevent busy shifting and thereby improve ability to follow a target speed, thus are capable of improving marketability of the speed limit apparatuses.

Although the above-described embodiments have been described based on hybrid electric vehicles, particularly plug-in hybrid electric vehicles (PHEVs), if the operation of the vehicle speed corrector 245 and the operation of the virtual APS corrector 246, other than the operation of the CD/CS mode corrector 247, are applied to general internal combustion engines, the same effects may be acquired.

The present invention may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid-state disk (SSD), a silicon disk drive (SDD), a ROM, a RAM, a CD-ROM, a magnetic tape, a floppy disk, an optical data storage device, etc.

As is apparent from the above description, a hybrid electric vehicle and a method for controlling a speed limit therefor according to at least one embodiment of the present invention may provide a more effective vehicle speed limit function.

Particularly, the method prevents frequent shifting and overshoot during a process of following a target limit speed when a vehicle speed limit function is applied to the hybrid electric vehicle, to which two shifting patterns having different efficiency characteristics are selectively applied, thereby allowing the hybrid electric vehicle to effectively, rapidly and stably reach the target limit speed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for controlling a speed limit of a hybrid electric vehicle, the method comprising:
   determining a virtual vehicle speed as being a lower one of an actual vehicle speed and a target limit speed, wherein the virtual vehicle speed is transmitted to a hybrid control unit;
   determining a virtual accelerator position sensor (APS) value as being a larger one of a first APS value and a second APS value, wherein the first APS value corresponds to a constant-speed driving load set to achieve the target limit speed based on load conditions and the second APS value corresponds to the target limit speed;
   operating the vehicle in a first mode when an actual APS value and the virtual APS value are substantially the same and transitioning to a second mode when the actual APS value and the virtual APS value become different, wherein the first mode is a mode for sustaining a state of charge (SOC) of a battery at the target limit speed and the second mode is a mode for depleting the SOC; and
   determining a transmission gear position by applying the determined virtual vehicle speed and the determined virtual APS value to one of a first shifting pattern and a second shifting pattern, wherein the first shifting pattern corresponds to the first mode and the second shifting pattern corresponds to the second mode.

2. The method according to claim 1, wherein determining the virtual APS value comprises:
   calculating the constant-speed driving load at the target limit speed; and
   acquiring the first APS value by applying the constant-speed driving load to a torque-APS conversion map.

3. The method according to claim 1, wherein transitioning to the second mode comprises:
   determining a reference power for transitioning between the first mode and the second mode based on the SOC;
   determining the constant-speed driving load at the target limit speed; and
   determining that the hybrid electric vehicle is to transition to the second mode when the reference power is greater than the constant-speed driving load.

4. A method for controlling a speed limit of a hybrid electric vehicle, the method comprising:
   correcting a virtual vehicle speed to a target limit speed when an actual vehicle speed is higher than the target limit speed, wherein the virtual vehicle speed is transmitted to a hybrid control unit;
   correcting a virtual accelerator position sensor (APS) value to a first APS value when the first APS value is smaller than a second APS value, wherein the first APS value corresponds to a constant-speed driving load set to achieve the target limit speed based on load conditions and the second APS value corresponds to the target limit speed;
   operating the vehicle in a first mode when an actual APS value and the virtual APS value are substantially the same and transitioning to a second mode when the actual APS value and the virtual APS value become different, wherein the first mode is a mode for sustaining a state of charge (SOC) of a battery at the target limit speed and the second mode is a mode for depleting the SOC; and
   determining a transmission gear position by applying the virtual vehicle speed and the virtual APS value to one of a first shifting pattern and a second shifting pattern, wherein the first shifting pattern corresponds to the first mode and the second shifting pattern corresponds to the second mode.

5. The method according to claim 4, wherein correcting the virtual APS value comprises:
   calculating the constant-speed driving load at the target limit speed; and
   acquiring the first APS value by applying the constant-speed driving load to a torque-APS conversion map.

6. The method according to claim 4, wherein transitioning to the second mode comprises:
   determining a reference power for transitioning between the first mode and the second mode based on the SOC;
   determining the constant-speed driving load at the target limit speed; and
   determining that the hybrid electric vehicle is to transition to the second mode when the reference power is greater than the constant-speed driving load.

7. A hybrid electric vehicle comprising:
   an engine;
   a transmission coupled to the engine;
   a drive motor and an engine clutch mounted between the engine and the transmission, the engine clutch including a battery;
   a vehicle computer system that includes a hybrid control unit; and
   a non-transitory computer readable recording medium storing programs that, when executed by the vehicle computer system, causes the vehicle computer system to:
      determine a virtual vehicle speed as being a lower one of an actual vehicle speed and a target limit speed, wherein the virtual vehicle speed is transmitted to the hybrid control unit;
      determine a virtual accelerator position sensor (APS) value as being a larger one of a first APS value and a second APS value, wherein the first APS value corresponds to a constant-speed driving load set to achieve the target limit speed based on load conditions and the second APS value corresponds to the target limit speed;

determine to operate the vehicle in a first mode when an actual APS value and the virtual APS value are substantially the same and transition to a second mode when the actual APS value and the virtual APS value become different, wherein the first mode is a mode configured to sustain a state of charge (SOC) of the battery at the target limit speed and the second mode is a mode configured to deplete the SOC; and determine a transmission gear position by applying the determined virtual vehicle speed and the determined virtual APS value to one of a first shifting pattern and a second shifting pattern, wherein the first shifting pattern corresponds to the first mode and the second shifting pattern corresponds to the second mode.

8. The hybrid electric vehicle according to claim 7, wherein the programs causes the vehicle computer system to calculate the constant-speed driving load at the target limit speed, and acquire the first APS value by applying the constant-speed driving load to a torque-APS conversion map.

9. The hybrid electric vehicle according to claim 7, wherein the programs causes the vehicle computer system to determine a reference power configured to transition between the first mode and the second mode based on the SOC, determine the constant-speed driving load at the target limit speed, and determine that the hybrid electric vehicle is to transition to the second mode when the reference power is greater than the constant-speed driving load.

10. The hybrid electric vehicle according to claim 7, wherein the vehicle computer system further comprises a transmission control unit.

11. The hybrid electric vehicle according to claim 10, wherein the hybrid control unit is configured to determine the virtual vehicle speed, determine the virtual APS value, and determine the transition to the second mode and wherein the transmission control unit configured to determine the transmission gear position.

12. A hybrid electric vehicle comprising:
an engine;
a transmission coupled to the engine;
a drive motor and an engine clutch mounted between the engine and the transmission, the engine clutch including a battery;
a vehicle computer system that includes a hybrid control unit; and a non-transitory computer readable recording medium storing programs that, when executed by the vehicle computer system, causes the vehicle computer system to:

correct a virtual vehicle speed to a target limit speed when a vehicle speed is higher than the target limit speed, wherein the virtual vehicle speed is transmitted to the hybrid control unit;

correct a virtual APS value to a first APS value when the first APS value is smaller than a second APS value, wherein the first APS value corresponds to a constant-speed driving load set to achieve the target limit speed based on load conditions and the second APS value corresponds to the target limit speed;

determine to operate the vehicle in a first mode when an actual APS value and the virtual APS value are substantially the same and transition to a second mode when the actual APS value and the virtual APS value become different, wherein the first mode is a mode configured to sustain a state of charge (SOC) of the battery at the target limit speed and the second mode is a mode configured to deplete the SOC; and determine a transmission gear position by applying the virtual vehicle speed and the virtual APS value to one of a first shifting pattern and a second shifting pattern, wherein the first shifting pattern corresponds to the first mode and the second shifting pattern corresponds to the second mode.

13. The hybrid electric vehicle according to claim 12, wherein the programs causes the vehicle computer system to calculate the constant-speed driving load at the target limit speed, and acquire the first APS value by applying the constant-speed driving load to a torque-APS conversion map.

14. The hybrid electric vehicle according to claim 12, wherein the programs causes the vehicle computer system to determine a reference power for transitioning between the first mode and the second mode based on the SOC, determine the constant-speed driving load at the target limit speed, and determine that the hybrid electric vehicle is to transition to the second mode when the reference power is greater than the constant-speed driving load.

15. The hybrid electric vehicle according to claim 12, wherein the vehicle computer system further comprises a transmission control unit.

16. The hybrid electric vehicle according to claim 15, wherein the hybrid control unit is configured to determine the virtual vehicle speed, determine the virtual APS value, and determine the transition to the second mode and wherein the transmission control unit configured to determine the transmission gear position.

* * * * *